(12) United States Patent
Choi et al.

(10) Patent No.: US 7,020,884 B2
(45) Date of Patent: Mar. 28, 2006

(54) TRAY GUIDE MECHANISM FOR AN OPTICAL DISC DRIVE

(75) Inventors: Un-jin Choi, Seoul (KR); Byoung-young Bae, Pyeongtaek-si (KR); Soon-kyo Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 10/289,214

(22) Filed: Nov. 7, 2002

(65) Prior Publication Data

US 2003/0117928 A1    Jun. 26, 2003

(30) Foreign Application Priority Data

Nov. 15, 2001   (KR)   ................ 10-2001-0071097

(51) Int. Cl.
*G11B 33/02*     (2006.01)
(52) U.S. Cl. .................................... 720/613
(58) Field of Classification Search ............ 720/613, 720/622–623, 641
See application file for complete search history.

(56) References Cited

U.S. PATENT DOCUMENTS

| | | | | |
|---|---|---|---|---|
| 4,773,057 | A * | 9/1988 | Otsuka et al. ............ | 720/603 |
| 5,862,116 | A * | 1/1999 | Watanabe et al. .......... | 720/673 |
| 6,151,285 | A | 11/2000 | Watanabe et al. | |
| 6,208,605 | B1 * | 3/2001 | Akiba ..................... | 720/613 |

FOREIGN PATENT DOCUMENTS

JP         9-223347      8/1997
JP         11-345483    12/1999

* cited by examiner

*Primary Examiner*—George J. Letscher
(74) *Attorney, Agent, or Firm*—Stein, McEwen & Bui, LLP

(57) ABSTRACT

A tray guide mechanism for an optical disc drive guides a backward and forward movement of a tray installed to slide into and out of a housing made of a lower case and an upper case. The tray guide mechanism includes guide rails installed to slide into and out of both sides of the upper case, a guide rail supporting unit installed at both sides of the lower case, to prevent the guide rails from deviating from a backward and forward moving path, and rail combiners formed at both sides of the tray in a moving path of the tray, and combined with the guide rails to slide into the guide rails. The tray guide mechanism also includes a forward moving distance limiting unit to limit a moving distance of the tray and the guide rails in a direction to which the tray and the guide rails project to prevent the tray from detaching from the housing. The tray guide mechanism also includes vertical and horizontal restrainers to prevent vertical and horizontal movement of the tray. The guide rails are shaped such that the rail combiners are inserted thereinto, and includes rails which slide into and out of the rail combiners while remaining in contact with the rail combiners. The guide rails also include rail covers which are fixed to outer sides of the rails and slide into and out of the lower case while being in contact with the lower case. The tray guide mechanism is configured such that a guide rail is installed in contact with a rail and a rail cover, and thus is strengthened to firmly support the tray and is installed in a narrow space of the compact optical disc drive. Also, the tray guide mechanism includes the vertical and horizontal restrainers that prevent vertical and horizontal vibration or swaying of the tray.

30 Claims, 16 Drawing Sheets

TRAY GUIDE MECHANISM FOR AN OPTICAL DISC DRIVE

CROSS-REFERENCE TO RELATED APPLICATION

This application claims the benefit of Korean Application No. 2001-71097, filed Nov. 15, 2001, in the Korean Intellectual Property Office, the disclosure of which is incorporated herein by reference.

BACKGROUND OF THE INVENTION

1. Field of the Invention

The present invention relates to an optical disc drive, and more particularly, to a tray guide mechanism that is easily inserted into and ejected from a narrow chassis of a slim optical disc drive.

2. Description of the Related Art

In general, an optical disc drive is an apparatus that is used to record or reproduce data to/from an optical recording medium such as a compact disc (CD) or a digital versatile disc (DVD) by irradiating light thereon. The optical disc drive is mainly used in a computer. Particularly, an ultra thin optical disc drive is required in a notebook-sized personal computer.

FIG. 1 is a view of an example of a conventional optical disc drive which is disclosed in Japanese Patent Laid-Open Publication No. Hei 9-223347. FIGS. 2 and 3 are views of right and left sides, respectively, of a tray guide mechanism of the optical disc drive of FIG. 1.

Referring to FIGS. 1 through 3, the conventional slim optical disc drive includes a housing 10 that is composed of a lower case 18 and an upper case 19, and a tray 12 that is inserted into and detached from the housing 10. A main base 16 is combined with the tray 12 and includes a spindle motor 26 that rotates a disc. The main base 16 also includes an optical pickup unit 23 that is used to reproduce data recorded on the disc, and a shift unit (not shown) that shifts the optical pickup unit 23 backward and forward in a radius direction of the disc. Therefore, the tray 12 may move in and out of the housing 10 together with the spindle motor 26 and the optical pickup unit 23.

The conventional optical disc drive also includes a tray guide mechanism which guides the tray 12 to move forward and backward as indicated by an arrow A–B shown in FIG. 1. The tray guide mechanism includes rail combiners 29 and 30 that are formed at sides of the tray 12, and sliding rails 31 and 32 that guide the rail combiners 29 and 30, and glide to engage with the rail combiners 29 and 30. The tray guide mechanism also includes fixing guides 33 and 34 that are firmly installed at both corners of the lower case 18 to support the sliding rails 31 and 32 which guide and glide the rail combiners 29 and 30.

As shown in FIG. 2, the sliding rail 31 moves along the fixed guide 33 in the A and B direction at the same time as the tray 12 moves out of the optical disc drive. When the tray 12 reaches a position where the disc may be exchanged with another disc, a protrusion 33b of a detent 33a of the fixed guide 33 fits into a hole 31b of the sliding rail 31 to prevent the sliding rail 31 from moving in an ejecting direction B.

As shown in FIG. 3, the sliding rail 32 moves along the fixed guide 34 in the A and B direction at the same time as the tray 12 moves out of the optical disc drive. When the tray 12 reaches a position where the disc may be exchanged with another disc, a protrusion 34b of a detent 34a of the fixing guide 34 fits into a hole 32b. As a result, the sliding rail 32 is prevented from moving further in the ejecting direction B.

Meanwhile, although not illustrated in the above described drawings, in the housing 10 and at a bottom of the tray 12 is installed a locking unit that locks the tray 12 in the housing 10. Also installed, is an ejector that allows the tray 12 to be ejected from the housing 10. As shown in FIG. 1, a front bezel 15 is attached to a front end of the tray 12, and includes an ejection switch part 14 that is pushed to operate an ejector that allows the tray 12 to move in and out of the optical disc drive.

When the disc is loaded into the optical disc drive having the above mechanism, the tray 12 is ejected from the housing 10, the disc is placed on the spindle motor 26, and then the disc is inserted into the housing 10. As a result, the locking unit operates to lock the tray 12 into the housing 10, and when the disc is unloaded from the optical disc drive, the ejection switch part 14 is pushed to operate the ejector to push the tray 12 out of the housing 10.

However, in the conventional optical disc drive, the sliding rails 31 and 32 are weighted with the tray 12 while the tray 12 is being ejected from the housing 10, and thus must be formed to a predetermined thickness. Also, the fixed guides 33 and 34, which are fixed on the lower case 18, are generally made of a plastic material so as to reduce noise due to friction between the fixed guides 33 and 34 and the sliding rails 31 and 32. Therefore, each of the fixed guides 33 and 34 must be formed to a predetermined thickness, usually at least 1 mm, so that they do not deform when they are loaded with the sliding rails 31 and 32. Considering the structure of the tray guide mechanism as described above, the sliding rails 31 and 32 and the fixed guides 33 and 34 must conform to a predetermined thickness in order to keep their shape, and thus there is a limitation in size of the conventional optical disc drive.

Further, the fixed guides 33 and 34, the sliding rails 31 and 32 and the rail combiners 29 and 30 glide to engage with one another when the tray 12 is inserted into the optical disc drive, which requires a predetermined interval therein. In the predetermined interval, the tray 12 may sway from side to side or upward and downward, due to vibration from a rotation of the disc and the spindle motor 26, or impact from outside of the optical disk drive. The swaying of the tray 12 may result in errors in reading data stored by the optical pickup unit 23.

FIGS. 4A through 4C are views of a mechanism that is designed to prevent the swaying of a tray 42, disclosed in U.S. Pat. No. 6,151,285 issued on Nov. 21, 2000 to Watanabe et al. Referring to FIG. 4A, one end of a holding unit 43 having a roller 45 is fixed along a sidewall 41 of a chassis (i.e., a lower case of a housing). An arm 46 of the holding unit 43 functions as a plate spring, and the roller 45 rolls along a side 42a of a tray 42 when the tray 42 moves backward and forward in directions C and D. As shown in FIG. 4A, if the tray 42 is completely inserted into a housing (not shown), the roller 45 falls into a concaved portion 42f formed at a front end of the tray 42, thus preventing movement of the tray 42 in the direction C. As a result, the tray 42 does not sway backward and forward. The roller 45 presses the side 42a of the tray 42 in a direction E due to an elastic force of the arm 46 thus, preventing the tray 42 from swaying side to side.

Referring to FIG. 4B, while the tray 42 is ejected from the housing, the roller 45 rolls along the side 42a of the tray 42, pressing the tray 42 in the direction E, thereby preventing the tray 42 from swaying from side to side.

Referring to FIG. 4C, once the tray 42 is completely ejected from the housing, the roller 45 falls into a concaved portion 42g at a rear end of the tray 42, thereby preventing movement of the tray 42 in the direction D. Further, the tray 42 does not sway backward and forward. Also, the roller 45 presses the side 42a of the tray 42 in the direction E, thus preventing the tray 42 from swaying from side to side.

However, the holding unit 43 suppresses the swaying of the tray 42 only in a horizontal direction and not in a vertical direction. Also, the holding unit 43 is positioned above the tray guide mechanism so as not to collide with the tray guide mechanism that guides the tray 42 to move backward and forward, thus increasing a height of the disc drive. Therefore, the above described mechanism as disclosed in U.S. Pat. No. 6,151,285, may prevent the swaying of the tray 42, but does not reduce the size of the optical disc drive.

SUMMARY OF THE INVENTION

Accordingly, it is an object of the present invention to provide a tray guide mechanism of an optical disc drive, which is easily inserted into and ejected from a narrow disc drive.

Additional objects and advantages of the invention will be set forth in part in the description which follows and, in part, will be obvious from the description, or may be learned by practice of the invention.

The foregoing and other objects of the present invention are achieved by providing a tray guide mechanism for an optical disc drive, which guides a backward and forward movement of a tray. The tray is installed to be inserted into and ejected from a housing made of a lower case and an upper case. The tray guide mechanism includes guide rails installed to slide into and out of both sides of the upper case, and a guide rail supporting unit installed at both sides of the lower case, to prevent the guide rails from deviating from a backward and forward moving path. The tray guide mechanism includes rail combiners formed at both sides of the tray in the moving path of the tray, and combined with the guide rails to slide into the guide rails, and a forward moving distance limiting unit to limit a moving distance of the tray and the guide rails in a direction to which the tray and the guide rails project to prevent the tray from detaching from the housing. The tray guide mechanism also includes vertical and horizontal restrainers to prevent a vertical and horizontal movement of the tray inserted into the housing. Accordingly, the guide rails are shaped such that the rail combiners are inserted thereinto, and include rails which slide into and out of the rail combiners while remaining in contact with the rail combiners. The guide rails also include rail covers which are fixed to outer sides of the rails and slide into and out of the lower case while being in contact with the lower case.

According to an aspect of the invention, the guide rail supporting unit includes a plurality of upper side supporting plates in contact with the upper sides of the guide rails, and a plurality of side supporting plates in contact with a side of each of the guide rails.

According to an aspect of the invention, the rails are formed of a pressed metallic material and the rail covers are molded of a plastic material.

According to an aspect of the invention, the rails and the rail covers are combined by a plurality of latches and a plurality of latch holes. The latches are formed to protrude from inner sides of the rail covers at predetermined intervals along a length thereof. The latch holes are formed to the rails and inserted into a plurality of latch holes of the rail covers. The rails and the rail covers are glued together with an adhesive.

The forward moving distance limiting unit of the tray includes first stoppers to protrude from front ends of the rails to a predetermined thickness, to limit the distance of the forward movement of the tray by being hooked by stoppers that protrude from inner sides of rear ends of the rail combiners when the tray reaches a position where a disc is ejected. The forward moving distance limiting unit also includes second stoppers to protrude from upper faces of the rail covers, to limit the forward movement of the guide rails by being hooked by the guide rail supporting unit when the guide rails are moved forward to a predetermined distance.

According to an aspect of the invention, the third stoppers are installed at rear ends of the guide rails to block rear ends of the rail combiners when the tray is moved backward, thereby moving the guide rails.

According to another aspect of the invention, the second and third stoppers are molded of a plastic material in one piece and assembled to the rear ends of the guide rails.

According to another aspect of the invention, the vertical restrainers include first vertical protrusions to protrude upward from upper sides of first elastic plates formed on rear ends of the rail covers, and first supporting plates to protrude forward from rear walls of the lower case, to press the first vertical protrusions downward while contacting the first vertical protrusions when the tray is inserted into the housing.

According to an aspect of the invention, the first elastic plates are extended from upper plates of the rail covers to a predetermined length to be narrower than a width of the upper plates of the rail covers. The first supporting plates are formed by bending a portion of the rear wall of the lower case forward.

According to yet another aspect of the invention, the vertical restrainers protrude downward from a bottom of second elastic plates, which are formed at front ends of the rail covers, and further include second vertical protrusions that press upper sides of front ends of the rail combiners when the tray is inserted into the housing.

According to an aspect of the invention, the vertical restrainers include third vertical protrusions that protrude upward from the upper sides of the front ends of the rail combiners to contact the second vertical protrusions.

According to an aspect of the invention, the second elastic plates are extended forward from the upper plates of the rail covers to a predetermined length to be narrower than the width of the upper plates of the rail covers.

According to another aspect of the invention, the vertical restrainers further include first supporting protrusions that protrude upward from an upper surface of a rear end of the tray, and second supporting protrusions that protrude downward from a bottom of rear ends of the upper case and come into contact with the first supporting protrusions when the tray is inserted into the housing.

According to an aspect of the invention, at least two first supporting protrusions are respectively positioned adjacent to both edges of the tray, and at least two second supporting protrusions are installed to correspond to the first supporting protrusions.

According to an aspect of the invention, the horizontal restrainers include a first horizontal protrusion that protrudes from an inner side of the first elastic plate formed at the rear end of the rail cover of at least one of the guide rails formed at the both sides of the lower case. The first horizontal protrusion presses an outer surface of the rear end of the tray when the tray is inserted into the housing.

According to another aspect of the invention, the horizontal restrainers further include a second horizontal protrusion that protrudes from an inner side of the second elastic plate formed at the front end of the rail cover of at least one of the guide rails installed at the both sides of the lower case. The second horizontal protrusion presses an outer surface of the front end of the tray when the tray is inserted into the housing.

According to yet another aspect of the invention, the horizontal restrainers further includes a fifth horizontal protrusion that protrudes outward from the outer surface of the tray and contacts the second horizontal protrusion.

According to an aspect of the invention, the horizontal restrainers include a third horizontal protrusion that protrudes outward from an outer side of a third elastic plate formed at the rear end of the rail cover of at least one of the guide rails, and a second supporting plate that protrudes inward from at least one wall of the lower case, to press the third horizontal protrusion inward while contacting the third horizontal protrusion when the tray is inserted into the housing.

According to an aspect of the invention, the third elastic plate is extended from a side plate of the rail cover to a predetermined length to be narrower than a width of the side plate of the rail cover, and the second supporting plate is formed by bending a portion of a sidewall of the lower case inward.

According to yet another aspect of the invention, the horizontal restrainers further include a fourth horizontal protrusion that protrudes outward from an outer side of a fourth elastic plate formed at the front end of the rail cover of at least one of the guide rails, and presses an inside portion of the sidewall of the lower case when the tray is inserted into the housing.

According to an aspect of the invention, the fourth elastic plate is extended from a side plate of the rail cover to a predetermined length to be narrower than the width of the side plate of the rail cover.

According to an aspect of the invention, the spacer that prevents a bumping of the guide rail against screw holes by which a hard disc drive is installed into a computer, is installed at a sidewall of the lower case to a predetermined thickness.

According to an aspect of the invention, the tray guide mechanism is configured so that the guide rail is installed in contact with a rail and the rail cover. The guide rail is strengthened to firmly support the tray and is installed in a narrow space of a compact optical disc drive. Also, the tray guide mechanism includes the vertical and horizontal restrainers that prevent vertical and horizontal vibration or swaying of the tray.

BRIEF DESCRIPTION OF THE DRAWINGS

The above and other objects and advantages of the invention will become apparent and more appreciated from the following description of the preferred embodiments, taken in conjunction with the accompanying drawings of which:

FIG. 10 shows a perspective view of a left front end of a tray;

FIG. 14 shows a perspective view of a rear end of a right guide rail inserted into the housing, and FIG. 15 shows a perspective view of a right front end of the tray;

DETAILED DESCRIPTION OF THE PREFERRED EMBODIMENTS

Figure 1:
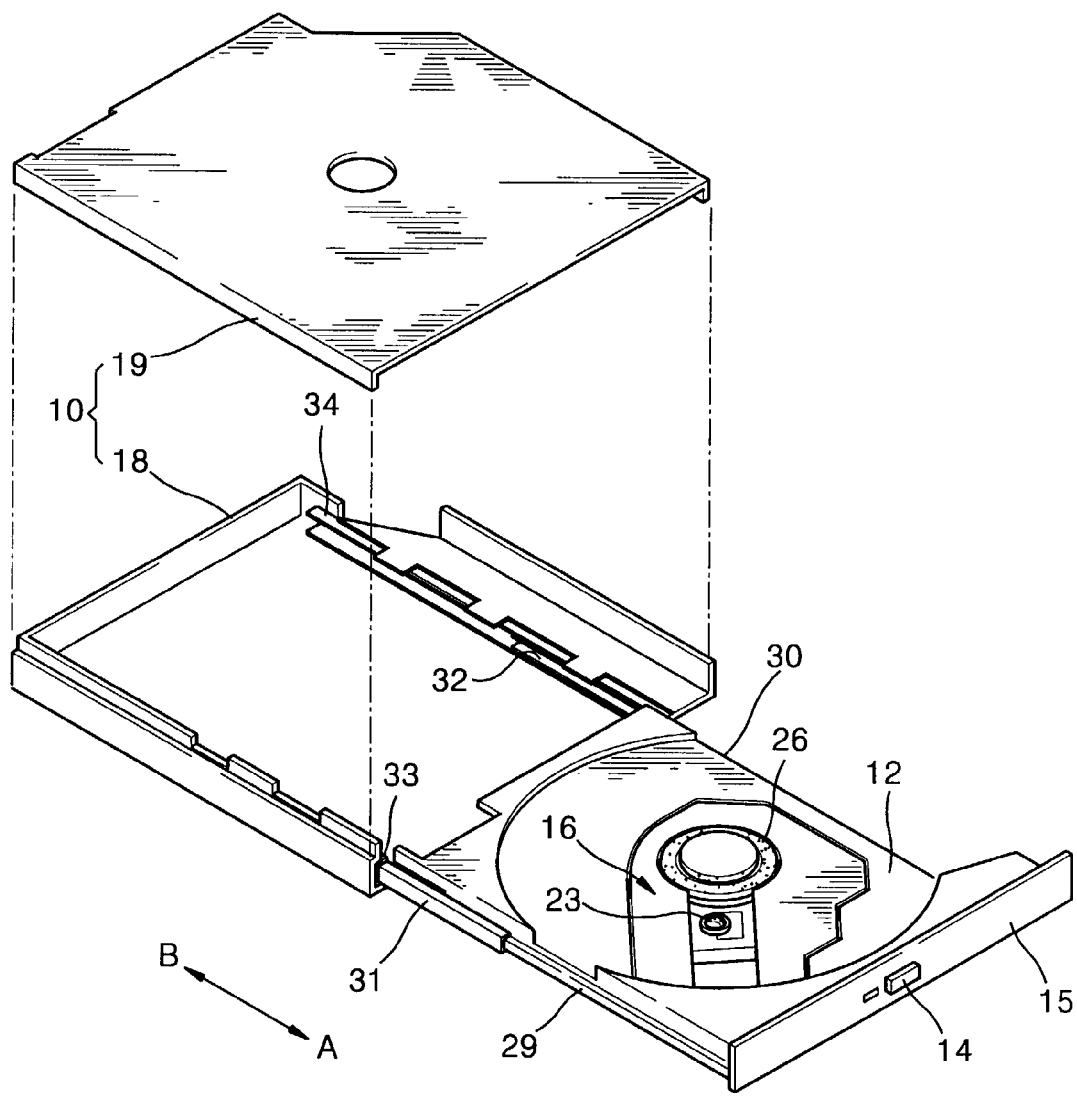
FIG. 1 is a perspective view of an example of a conventional optical disc drive.
Figure 2:
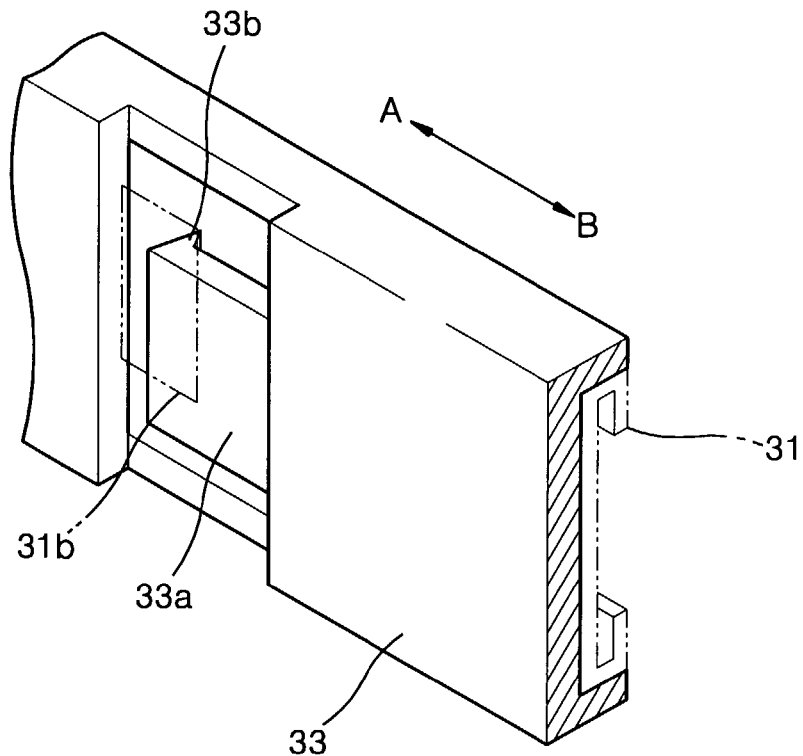
FIGS. 2 and 3 are views of left and right sides of the optical disc drive of FIG. 1.
Figure 3:
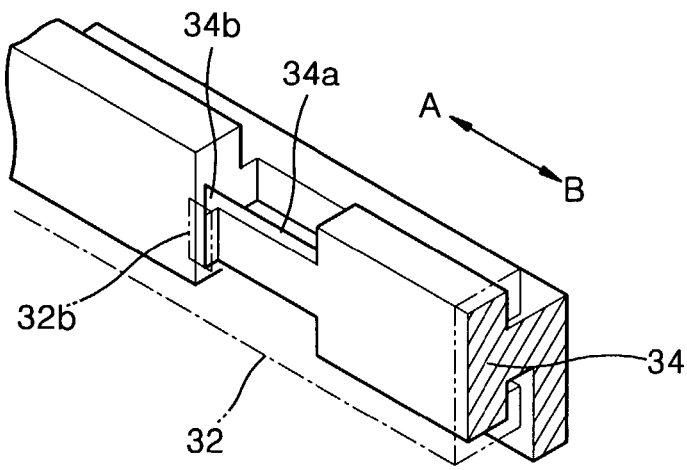
Figure 4A:
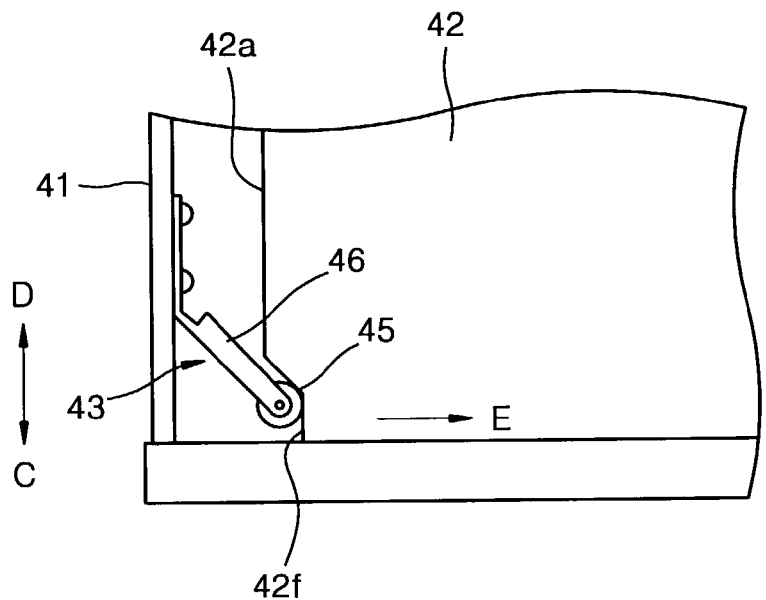
FIGS. 4A through 4C are views of a mechanism to prevent a swaying of a tray of conventional optical disc drives.
Figure 4B:
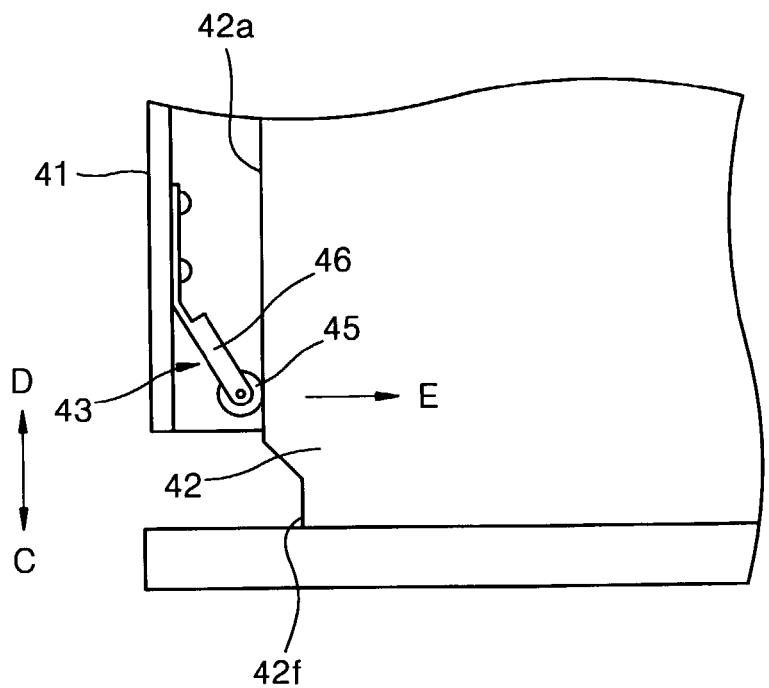
Figure 4C:
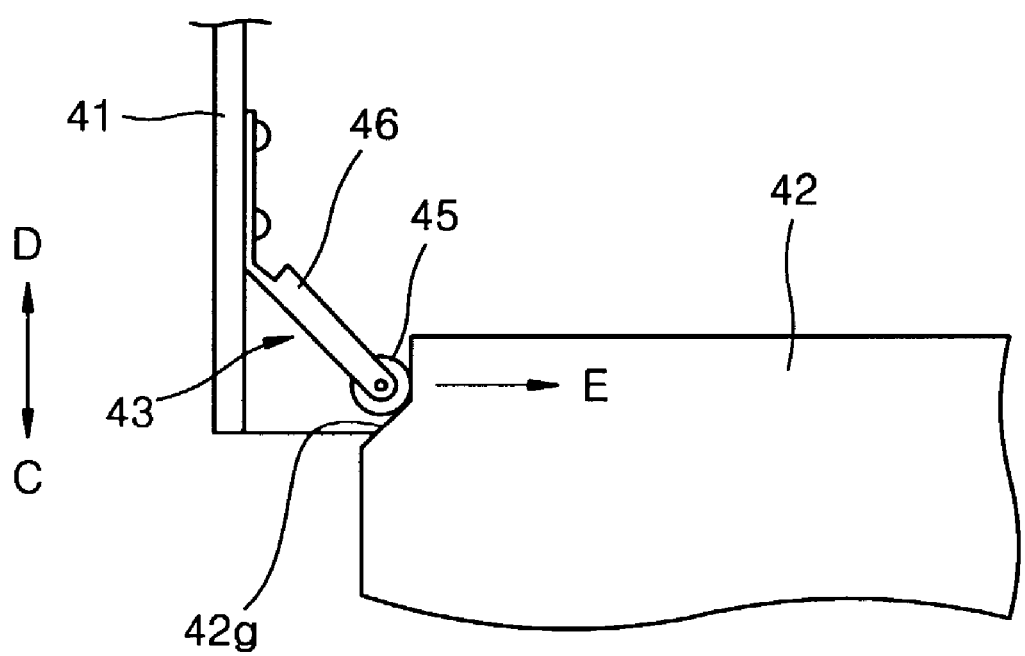

Reference will now be made in detail to the present preferred embodiments of the present invention, examples of which are illustrated in the accompanying drawings, wherein like reference numerals refer to like elements throughout.

Figure 5:
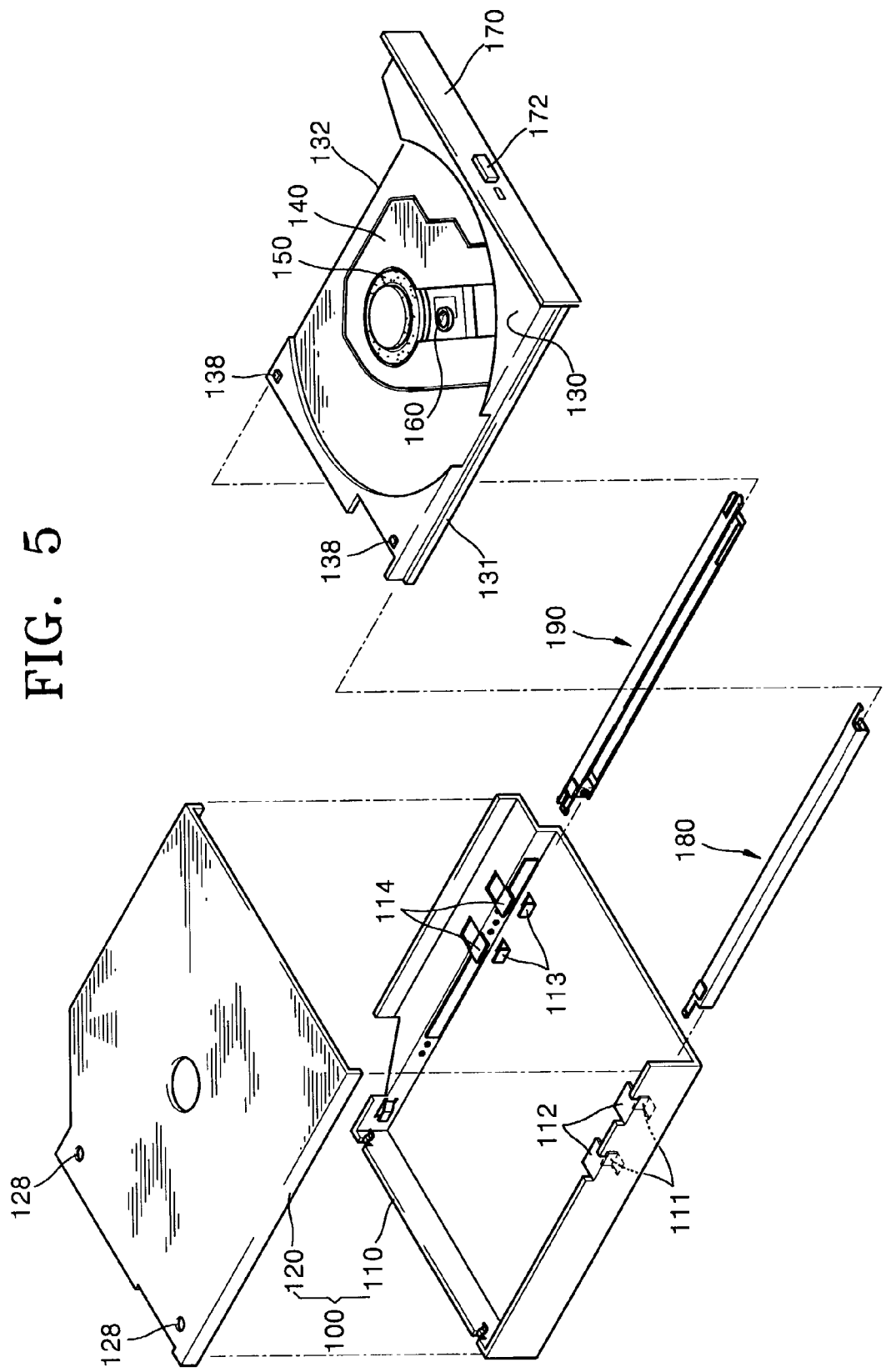
FIG. 5 is a cutaway perspective view of an optical disc drive adopting a tray guide mechanism, according to an embodiment of the present invention.

FIG. 5 is a cutaway perspective view of an optical disc drive adopting a tray guide mechanism, according to an embodiment of the present invention. The optical disc drive of FIG. 5 includes a housing 100 made of a lower case 110 and an upper case 120, and a tray 130 that is installed to be inserted into and ejected from the housing 100. The housing 100 is fixed in an electronic appliance having a slim optical disc drive, e.g., a computer, a notebook computer, etc. The tray 130 is combined with a main base 140. In the main base 140 is installed a spindle motor 150 that rotates a disc, an optical pickup unit 160 that is used to reproduce data recorded on the rotating disc, and a shift unit (not shown) that moves the optical pickup unit 160 backward and forward in a radial direction of the disc. Therefore, the tray 130 is inserted into and ejected from the housing 100, together with the spindle motor 150 and the optical pickup unit 160. Although not illustrated in the drawings, in the housing 100 and at a bottom of the tray 130 is installed a locking unit that locks the tray 130 in the housing 100, and an ejector that ejects the tray 130 from the housing 100. A front bezel 170 is attached to a front end of the tray 130, and an ejection button 172 is installed at the front bezel 170 to operate the ejector.

Also, in the optical disc drive of FIG. 5 is installed a tray guide mechanism that guides a forward and backward movement of the tray 130. The tray guide mechanism includes guide rails 180 and 190 that are installed to glide into corners of the lower case 110, and rail combiners 131 and 132 that are formed to completely cover sides of the tray 130, and glide to engage with the guide rails 180 and 190, respectively. Also, to prevent the guide rails 180 and 190 from deviating from a moving path, the optical disc drive includes supporting plates 112 and 114 to contact an upper face of the guide rails 180 and 190, and supporting plates 111 and 113 to contact with a side of each of the guide rails 180 and 190. The supporting plates 111, 112, 113, and 114 are provided at both sides of the lower case 110. Accordingly, the guide rails 180 and 190 move backward and forward in a space defined by lower and side plates of the lower case 110 and the supporting plates 111 112, 113, and 114.

Figure 6A:
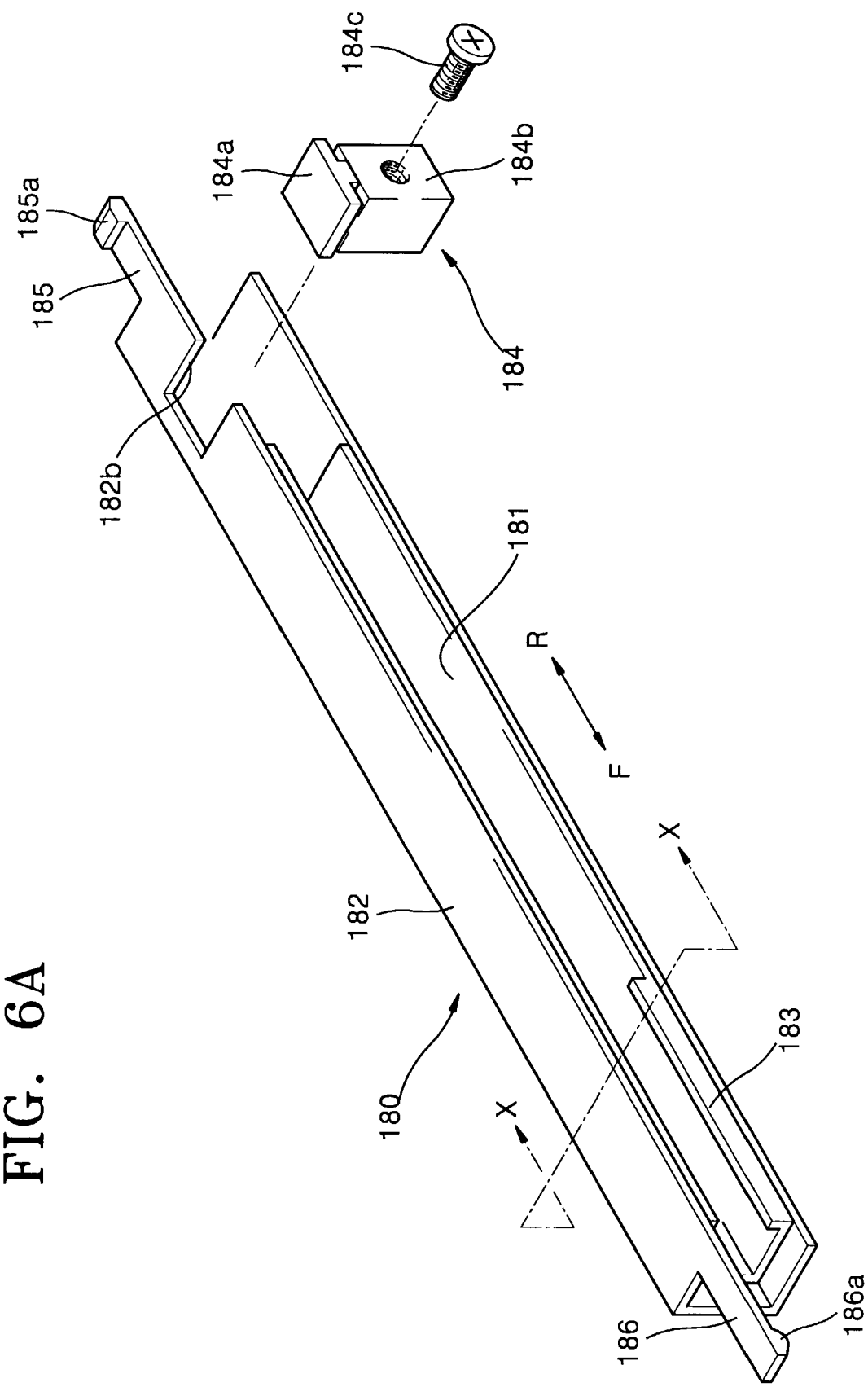
FIG. 6A is a perspective view of a left guide rail of the optical disc drive of FIG. 5.
Figure 6B:
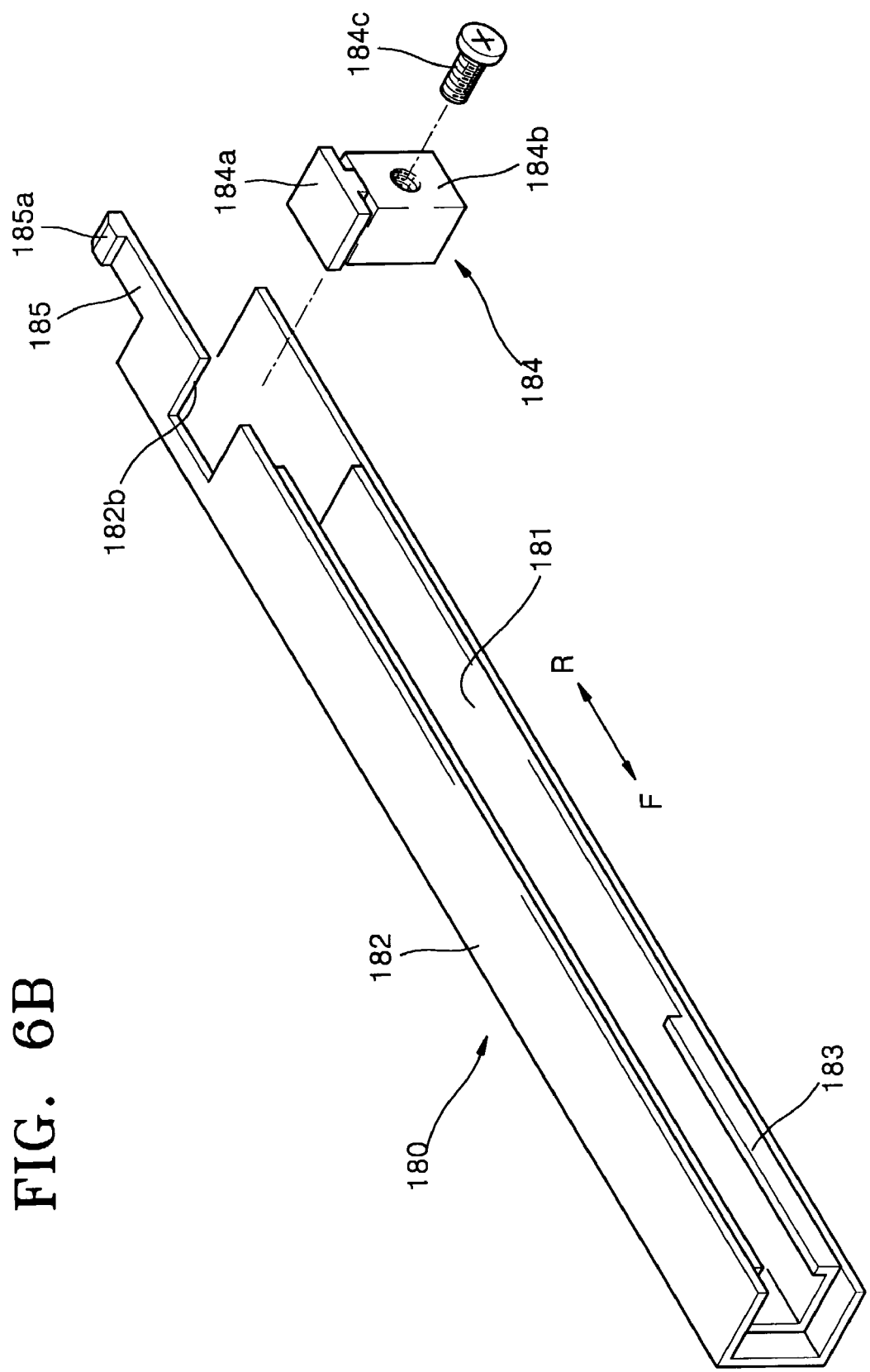
FIG. 6B is a perspective view of a modified example of the left guide rail of FIG. 6A.
Figure 7:
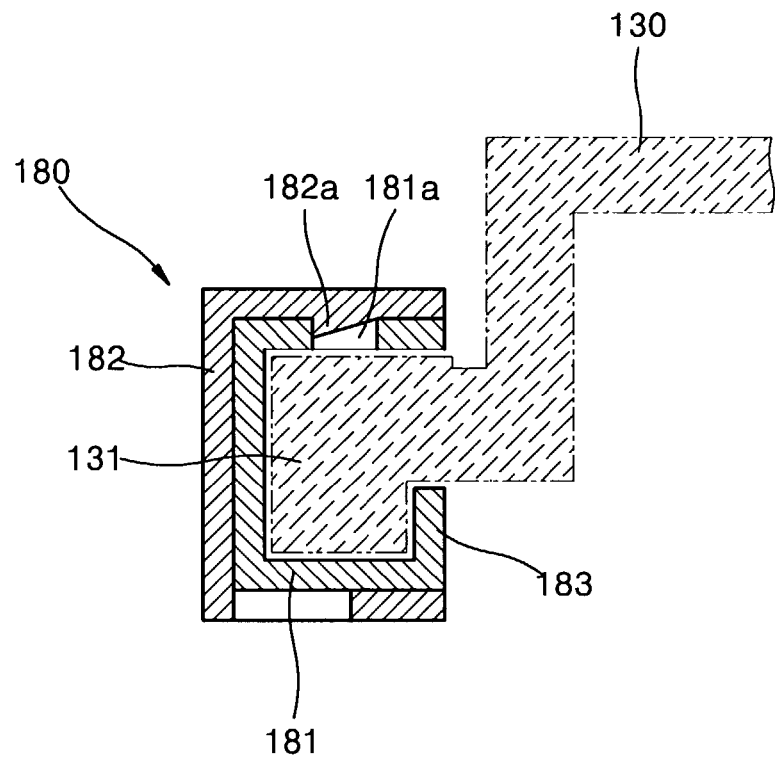
FIG. 7 is a cross-sectional view of the left guide rail of FIG. 6A, taken along the line X–X'.

FIG. 6A is a perspective view of the left guide rail 180 shown in FIG. 5, and FIG. 6B is a perspective view of a modified example of the left guide rail 180 shown in FIG. 5. FIG. 7 is a cross-sectional view of the left guide 180 rail of FIG. 6A, taken along the lines X–X'.

Referring to FIGS. 6A and 7, the left guide rail 180 includes a rail 181 that slides to make contact with the rail combiner 131 of the tray 130, and a rail cover 182 that engages with an outer side of the rail 181 and slides to make contact with the lower case 110. The rail 181 is formed to fit into the rail combiner 131 of the tray 130, and is made of a pressed metal strong enough to support the tray 130. The rail cover 182 is fixed to the outer side of the rail 181. A plurality of latches 182a are formed to protrude at predetermined intervals along a length of an inner side of the rail cover 182. Also, the rail 181 includes a plurality of latch holes 181a into which the latches 182a fit. However, the rail cover 182 and the rail 181 may be fixed to each other by an adhesive rather than the latches 182a and the latch holes 181a. Meanwhile, the rail cover 182 is molded of a plastic material to reduce noise when the rail cover 182 slides into the housing 100, and is in direct contact with the lower case 110.

As described above, in the tray guide mechanism according to the present invention, the left guide rail 180 is configured such that the rail 181 is integrally formed with the rail cover 182. Thus, an intensity of the guide rail 180 is so increased that the left guide rail 180 firmly supports the tray 130 while the tray 130 is ejected from the housing 100. Also, since the rail cover 182 is integrally formed with the rail 181, the rail cover 182 is made thinner than the fixed guides 33 and 34 installed in the conventional optical disc drive as shown in FIG. 1 (e.g., to a thickness of 0.5–0.8 mm). Therefore, it is possible to reduce a height of the left guide rail 180, thereby realizing a slimmer optical disc drive.

The left guide rail 180 includes a forward moving distance limiting unit to limit a movement of the tray 130 and the left guide rail 180. According to the forward moving distance limiting unit, the left guide rail 180 includes a first stopper 183 that limits the forward movement of the tray 130 in a direction F (the direction that the tray 130 is ejected from the housing 100). The left guide rail 180 also includes a second stopper 184a that limits the forward movement of the left guide rail 180 in the direction F. Also, a third stopper 184b is formed on the left guide rail 180 to enable the left guide rail 180 to move when the tray 130 moves backward in a direction R (the direction that the tray 130 is inserted into the housing 100).

The first stopper 183 is formed at a front end of the rail 181 to protrude at a predetermined height from a bottom of the rail 181. The second and third stoppers 184a and 184b may be molded with a plastic material as a single body to form a stopper assembly unit 184. The stopper assembly unit 184 is placed at a rear end of the left guide rail 180. The stopper assembly unit 184 is inserted into a groove 182b that is formed at a rear end of the rail cover 182, and then is fixed to the rail cover 182 by a connecting screw 184c. As a result of fixing the stopper assembly unit 184 to the rail cover 182, the second stopper 184a protrudes above an upper side of the rail cover 182 and the third stopper 184b is positioned in the rail 181.

Although the stopper assembly unit 184 is fixed to the rail cover 182 via the connecting screw 184c as described in the present invention, it may be assembled differently with the rail cover 182. For instance, it is possible to assemble the stopper assembly unit 184 and the rail cover 182 by a snapping method as the rail 181 is combined with the rail cover 182 shown in FIG. 7.

Hereinafter, the first through third stoppers 183, 184a and 184b will now be explained with reference to FIGS. 5, 6A and 8.

The tray 130 is ejected from the housing 100, and then moves forward to cover a predetermined distance together with the left guide rail 180, as indicated by the arrow 'F'. As a result, the second stopper 184a of the left guide rail 180 is stopped by the supporting plate 112 and thus, the left guide rail 180 cannot move forward any further.

Next, only the tray 130 slides forward along the left guide rail 180 to reach a position where the disc may be exchanged. At this time, the tray 130 is stopped by the first stopper 183 of the left guide rail 180 and cannot move forward any further.

Figure 8:
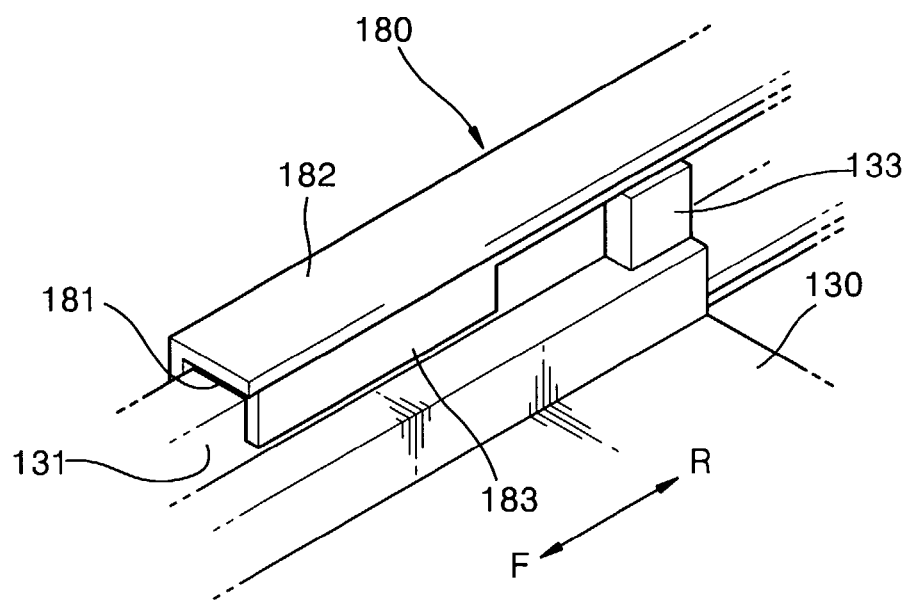
FIG. 8 is a perspective view of a left rear end of a tray that is turned upside down, to explain a forward moving distance limiting unit of a tray guide mechanism according to the present invention.

Referring to FIG. 8, a stopping sill 133 protrudes from an end portion of the inner side of the rail combiner 131 of the tray 130. The stopping sill 133 is stopped by the first stopper 183 of the left guide rail 180 when the tray 130 reaches the position where the disc may be exchanged, thereby preventing the forward movement of the tray 130. For this reason, the forward movement of the tray 130 and the left guide rail 180 is limited by the first and second stoppers 183 and 184a. Therefore, it is possible to prevent the tray 130 and the left guide rail 180 from moving forward excessively.

Meanwhile, the ejected tray 130 is inserted into the housing 100 as described below. First, the tray 130 slides backward along the guide rail 180, as indicated by the arrow R. Then, the end portion of the rail combiner 131 of the tray 130 comes into contact with the third stopper 184b that is formed at an end portion of the left guide rail 180. Thereafter, the tray 130 moves backward together with the left guide rail 180 and then is completely inserted into the housing 100.

Referring to FIG. 6A, the tray guide mechanism according to the present invention includes a vertical restrainer that restrains the tray 130 and the left guide rail 180 in a vertical direction, thereby preventing vertical vibration or swaying of the tray guide mechanism. The vertical restrainer includes a first elastic plate 185 that has a first vertical protrusion 185a, and is formed at the rear end portion of the rail cover 182 of the left guide rail 180. The vertical restrainer also includes a second elastic plate 186 that has a second vertical protrusion 186a and is formed at a front end of the rail cover 182.

Figure 9:
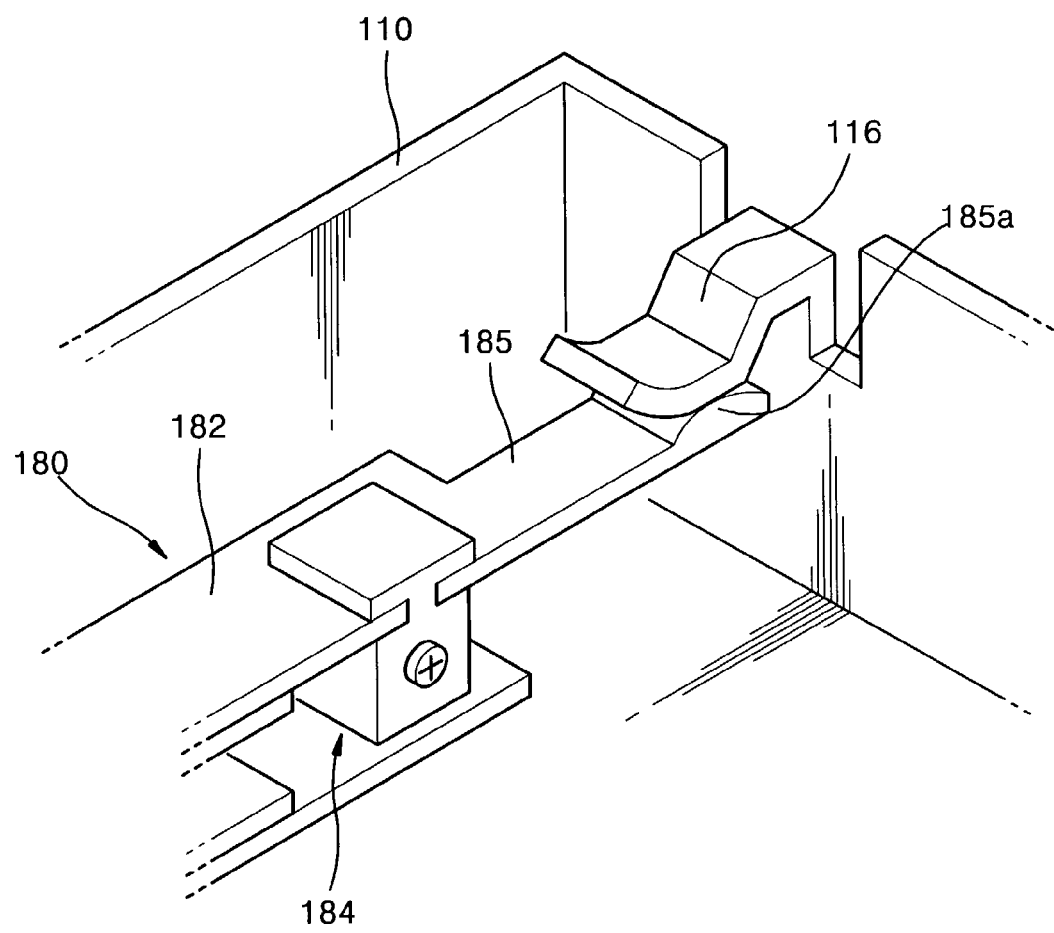
FIGS. 9 and 10 are views explaining vertical restrainers of a tray guide mechanism according to the present invention. shows a perspective view of a rear end of a left guide rail inserted into a housing.
Figure 10:
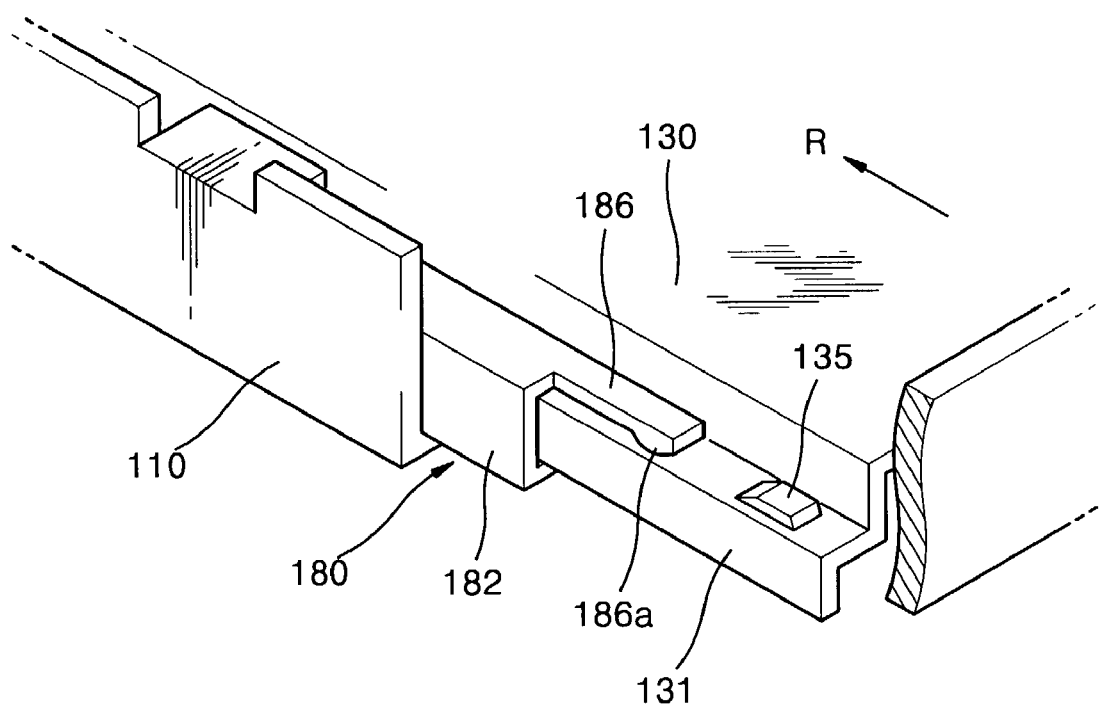

The first elastic plate 185 is formed by elongating an upper plate of the rail cover 182 to a predetermined length in a rear direction. A width of the first elastic plate 185 is narrower than that of the rail cover 182. The first vertical protrusion 185a protrudes from an upper surface of the first elastic plate 185. The second elastic plate 186 is formed by elongating the upper plate of the rail cover 182 to a predetermined length in a forward direction. A width of the second elastic plate 186 is narrower than the width of the rail cover 182. The second vertical protrusion 186a protrudes downward at a bottom of the second elastic plate 186. The vertical restrainer includes a first supporting plate 116 that protrudes forward from a back wall of the lower case 110 as shown in FIG. 9, and may include a third vertical protrusion 135 that protrudes upward from the front end of the rail combiner 131 as shown in FIG. 10. The first supporting plate 116 is formed to bend a portion of the back wall of the lower case 110 forward.

The vertical restrainers may be formed only at the rear end of the left guide rail 180 and not at the front end thereof, as shown in FIG. 6B. That is, the left guide rail 180 of the FIG. 6B includes the first elastic plate 185 formed at the rear end of the rail cover 182, and the first vertical protrusion 185a formed on the first elastic plate 185.

Hereinafter, an operation of the vertical restrainer of the left guide rail 180 will now be described with reference to FIGS. 6A, 6B, 9 and 10.

Referring to FIG. 9, when the tray 130 is fully inserted into the housing 100, the first vertical protrusion 185a comes into contact with the bottom of the first supporting plate 116 formed at the back wall of the lower case 110. Then, the first vertical protrusion 185a is pressed by the first supporting plate 116 to slightly bend the first elastic plate 185 downward, thereby preventing the left guide rail 180 from moving vertically with respect to the first supporting plate 116. Here, the first vertical protrusion 185a is pressed by the first supporting plate 116 due to the elastic action of the first elastic plate 185.

Referring to FIG. 10, the tray 130 is moved in the direction of the arrow R, and becomes fully inserted into the housing 100. As a result, the second vertical protrusion 186a, which is formed on the second elastic plate 186 extending from the rail cover 182, comes into contact with the third vertical protrusion 135, which is formed on the rail combiner 131 extending from the tray 130. Then, the second elastic plate 186 is slightly bent upward. Due to an elastic action of the second elastic plate 186, the second vertical protrusion 186a presses the third protrusion 135 downward, thereby preventing the tray 130 from moving vertically with respect to the left guide rail 180.

As described above, the vertical restrainer prevents the tray 130 from moving vertically with respect to the left guide rail 180, and also prevents the left guide rail 180 from moving vertically with respect to the lower case 110. As a result, the tray 130 cannot move vertically with respect to the housing 100. Thus, while reading data with the optical pickup unit 160, errors are prevented from occurring and vibrating noises are reduced. Also, the first and second elastic plates 185 and 186 are made by plastic injection and thus, have a predetermined elasticity. For this reason, the first and second elastic plates 185 and 186 may function as buffer agents against outer shocks.

Figure 11A:
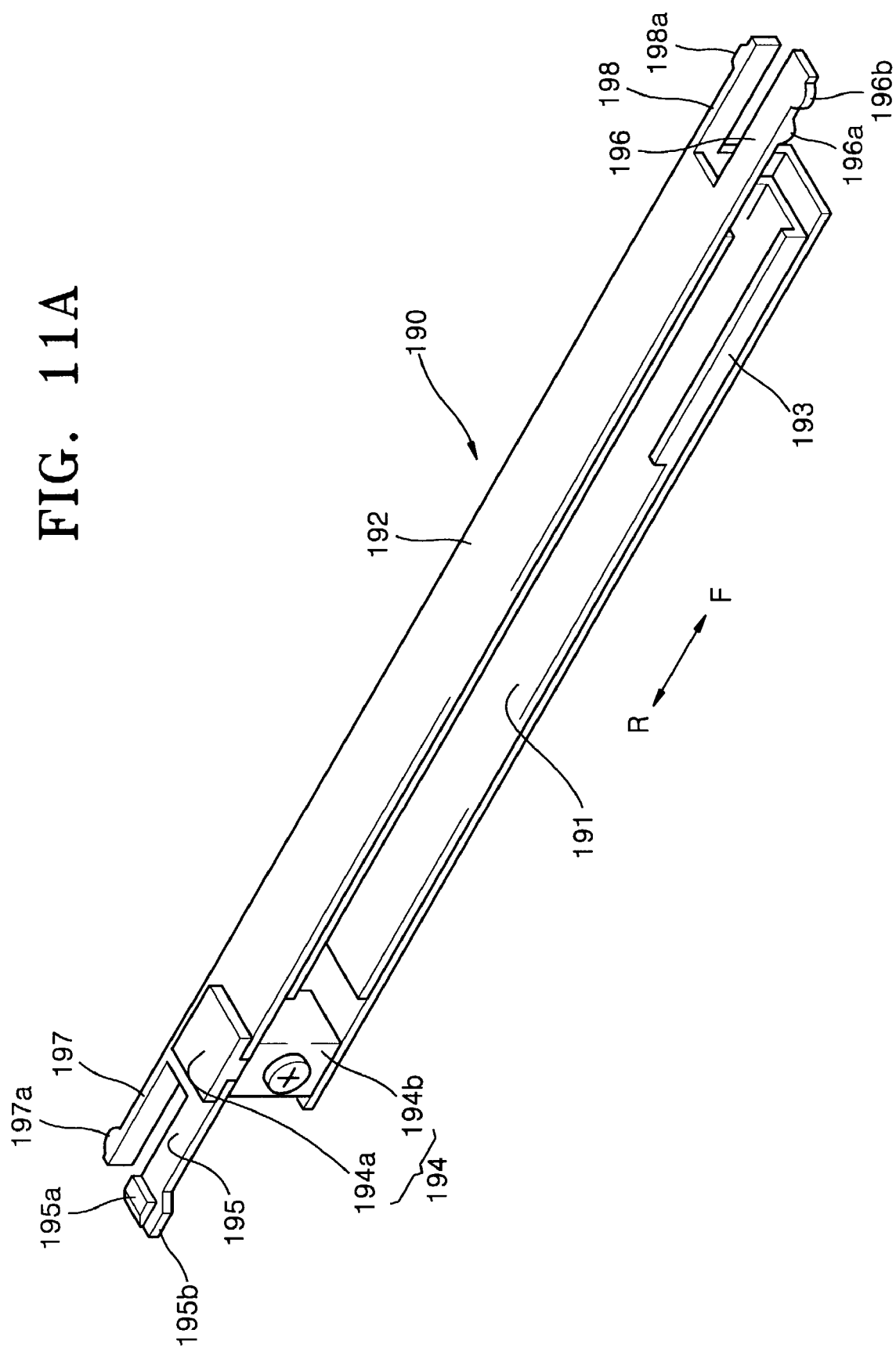
FIG. 11A is a perspective view of a right guide rail of a tray guide mechanism as shown in FIG. 5.
Figure 11B:
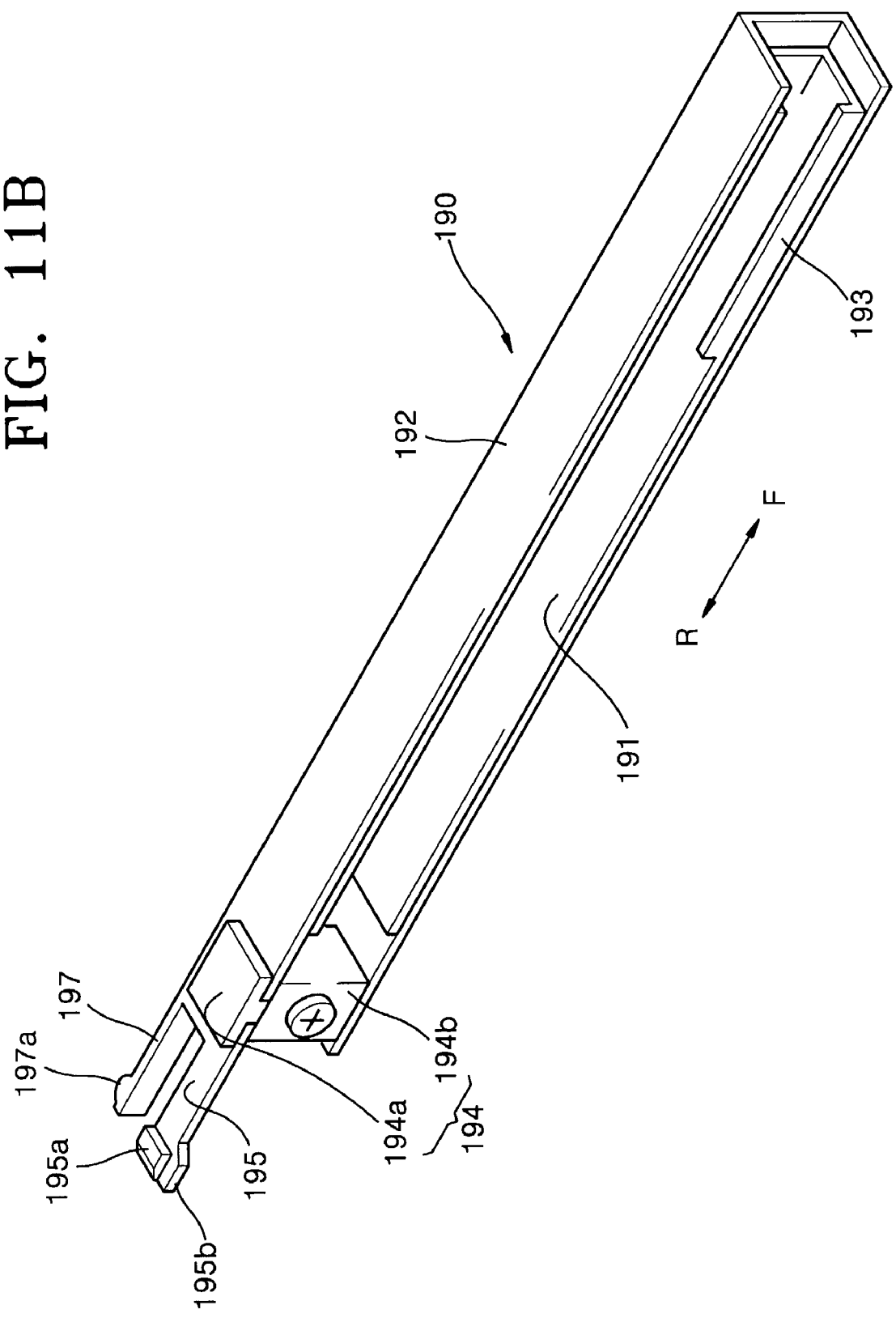
FIG. 11B is a perspective view of a modified example of the right guide rail as shown in FIG. 5.
Figure 12:
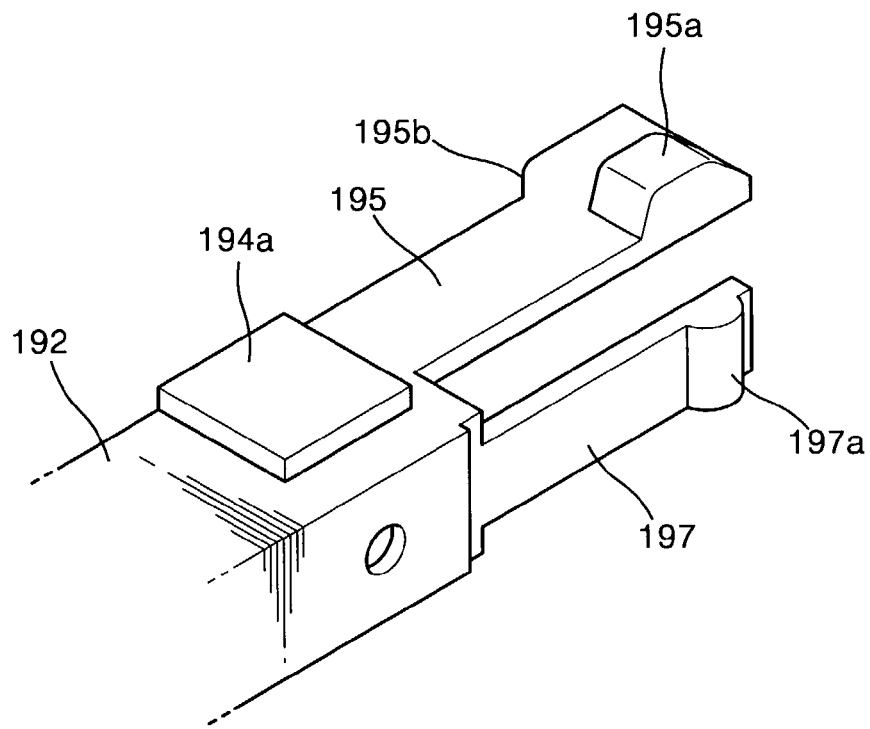
FIG. 12 is a perspective view of a rear end of the right guide rail of FIG. 11A.
Figure 13:
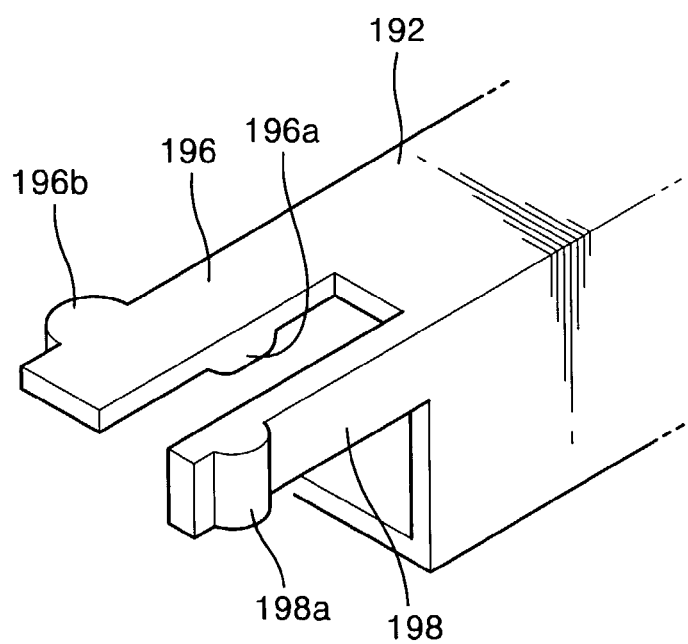
FIG. 13 is a perspective view of a front end of the right guide rail of FIG. 11A.

FIG. 11A is a perspective view of the right guide rail 190 shown in FIG. 5. FIG. 11B is a perspective view of a modified example of the right guide rail 190 of FIG. 5. FIGS. 12 and 13 are perspective views of rear and front ends, respectively, of the right guide rail 190. Here, the right guide rail 190 has the same structure and operation as the aforementioned right guide rail 180, except for a horizontal restrainer that will be described later. Therefore, the right guide rail 190 will be explained with respect to the horizontal restrainer hereinafter.

Referring to FIGS. 11A, 12 and 13, the right guide rail 190 is in contact directly with the right rail combiner 132 (as shown in FIG. 5) of the tray 130, and includes a rail 191 into which the right rail combiner 132 is inserted. The right guide rail 190 also includes a plastic rail cover 192 that is combined with an outer side of the rail 191. The rail 191 and the rail cover 192 may be combined with each other as illustrated in FIG. 7, or may be glued together with an adhesive. It is possible to realize a compact optical disc drive due to the structure of the guide rail 190 as described above.

The right guide rail 190 includes a forward moving distance limiting unit to limit the forward movement of the tray 130 and the right guide rail 190. The forward moving distance limiting unit includes a first stopper 193 that limits the movement of the tray 130 in a direction as shown by an arrow F, and a second stopper 194a that limits the forward movement of the right guide rail 190. Also, the right guide rail 190 includes a third stopper 194b that enables the right guide rail 190 to move when the tray 130 is moved backward in a direction as shown by an arrow R. The first stopper 193 is formed at the front end of the rail 191 from a bottom of the rail 191 by a predetermined height. The second and third stoppers 194a and 194b are molded together and made of a plastic material, to form a stopper assembly 194. The stopper assembly 194 is attached to a rear part of the guide rail 190. Operations of the first through third stoppers 193, 194a and 194b are the same as that of the left guide rail 180 of FIG. 6A. Therefore, an explanation of the first through third stoppers 193, 194a, and 194b will be omitted.

Figure 14:
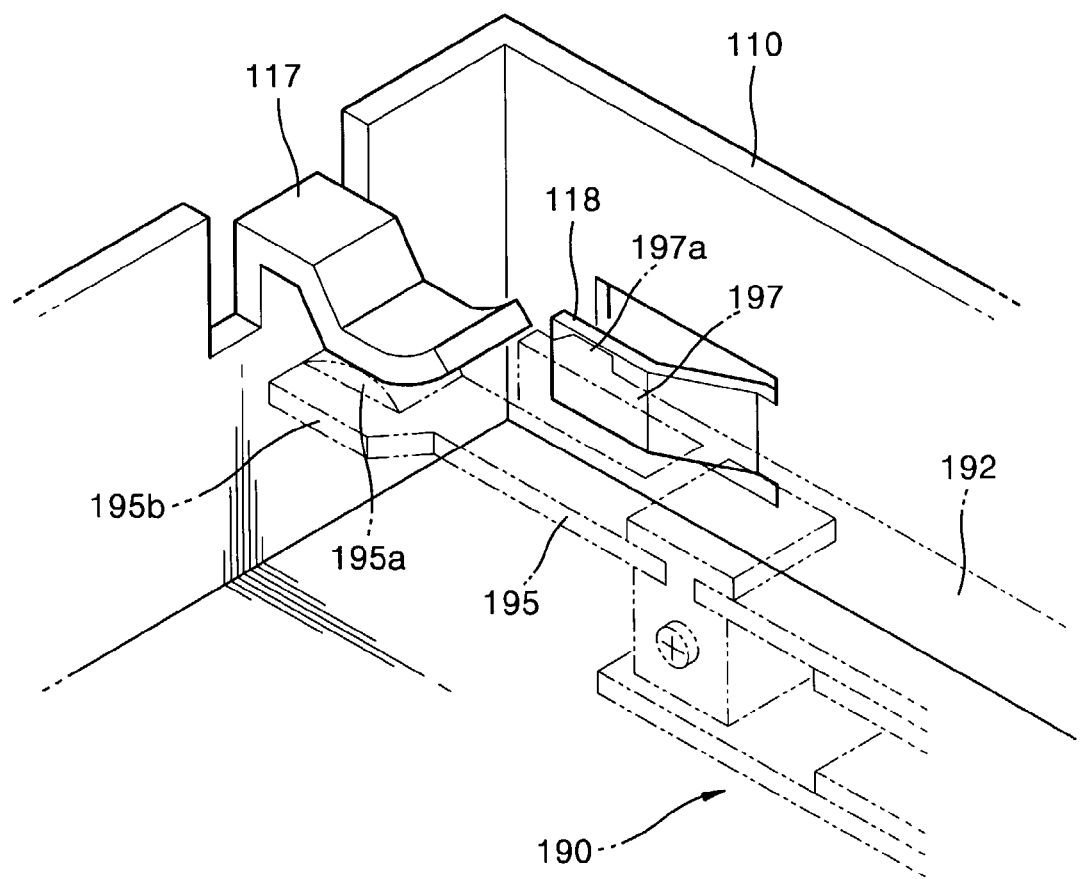
FIGS. 14 and 15 are views explaining vertical restrainers and horizontal restrainers of the tray guide mechanism according to the present invention.
Figure 15:
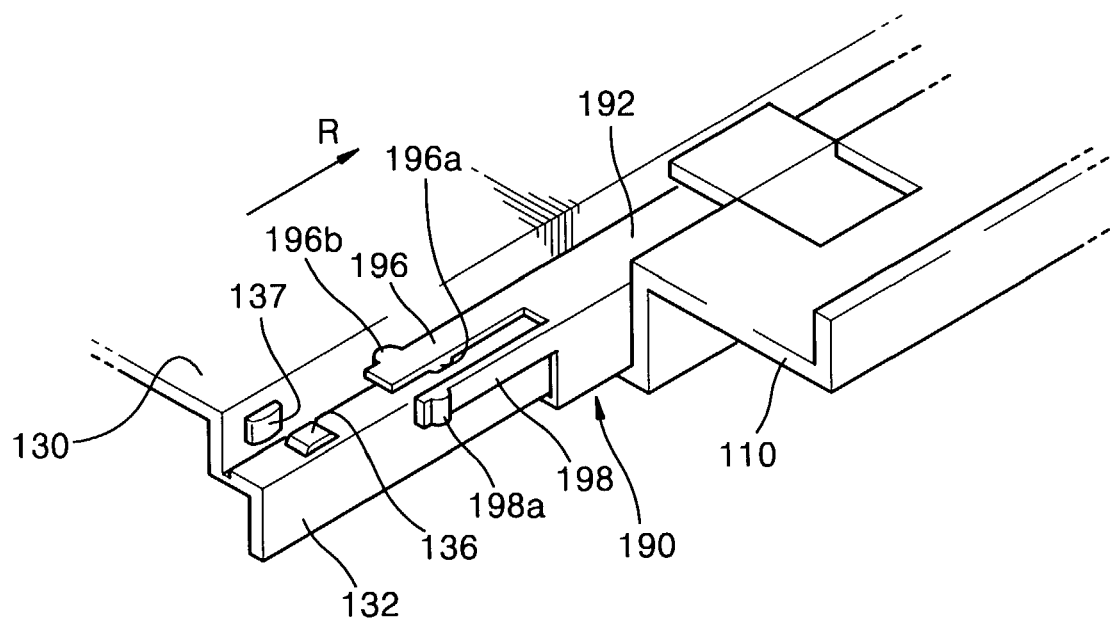

The tray guide mechanism for the optical disc drive according to the present invention includes vertical restrainers that limit the vertical movement of the tray 130 and the right guide rail 190 at a right side of the tray guide mechanism. The vertical restrainer includes a first elastic plate 195 that is extended from the rear end of the rail cover 192 of the right guide rail 190, and has a first vertical protrusion 195a at its upper side. The vertical restrainer also has a second elastic plate 196 that is extended from the front end of the rail cover 192, and has a second vertical protrusion 196a. The vertical restrainer includes a first supporting plate 117 that protrudes forward from the rear wall of the lower case 110 as shown in FIG. 14, and further includes a third vertical protrusion 136 that protrudes upward from an upper side of the right rail combiner 132 of the tray 130 as shown in FIG. 15.

Referring to FIGS. 11A, 12 and 13, the tray guide mechanism for the optical disc drive according to the present invention includes a horizontal restrainer that limits a horizontal movement of the tray 130, thereby preventing horizontal vibration or swaying of the tray 130. The horizontal restrainer includes a first horizontal protrusion 195b that protrudes from the first elastic plate 195 that is extended from the rear end of the rail cover 192 of the right guide rail 190, and a second horizontal protrusion 196b that protrudes from the second elastic plate 196 that is extended from the front end of the rail cover 192. The first horizontal protrusion 195b protrudes from one side of the first elastic plate 195 toward the tray 130, and the second horizontal protrusion 196b protrudes from one side of the second elastic plate 196.

Also, the horizontal restrainer further includes a third horizontal protrusion 197a that protrudes from a third elastic plate 197 that is extended from the rear end of the rail cover 192 of the right guide rail 190, and a fourth horizontal protrusion 198a that protrudes from a fourth elastic plate 198 that is extended from the front end of the rail cover 192. The third elastic plate 197 is extended from one side of the rail cover 192 to a predetermined length to be narrower than a width of the rail cover 192, and the third vertical protrusion 197a is formed on an outer side of the third elastic plate 197 to protrude toward one side of the lower case 110. The fourth elastic plate 198 is extended from another side of the rail cover 192 to a predetermined length to be narrower than the width of the rail cover 192, and the fourth horizontal protrusion 198a is formed on an outer side of the fourth elastic plate 198 to protrude toward the one side of the fourth elastic plate 198. Also, the horizontal restrainers may further include a second supporting plate 118 that protrudes inward from a right wall of the lower case 110 as shown in FIG. 14, and a fifth vertical protrusion 137 that protrudes outward from a right face of the front end of the tray 130 as shown in FIG. 15. The second supporting plate 118 may be formed by bending a portion of a sidewall of the lower case 110 inward.

As shown in FIG. 11B, the vertical and horizontal restrainers are formed on the rear end of the right guide rail 190, rather than the front end thereof. That is, the right guide rail 190 of FIG. 11B includes only the first and third elastic plates 195 and 197, which are formed on the rear end of the rail cover 192.

Hereinafter, the vertical and horizontal restrainers of the right guide rail 190 will now be described with reference to FIGS. 14 and 15. Operations of the vertical restrainers of the right guide rail 190 are the same as those of the vertical restrainers of the left guide rail 180 of FIG. 5, and thus, will be described briefly.

Referring to FIG. 14, if the tray 130 is fully inserted into the housing 100, the vertical protrusion 195a, which is formed on the first elastic plate 195 of the rail cover 192, comes into contact with a bottom of the first supporting plate 117 formed on the back wall of the lower case 110. Then, the first vertical protrusion 195a is pressed by the first supporting plate 117 and thus, the vertical movement of the guide rail 190 and the tray 130 is restrained.

Further, the first horizontal protrusion 195b, which is formed on the one side of the first elastic plate 195 of the rail cover 192, comes into contact with the right side of the tray 130, and thus presses the tray 130 in the left direction. Also, the third horizontal protrusion 197a, which is formed on the outer side of the third elastic plate 197 of the rail cover 192, comes into contact with the inner side of the second supporting plate 118 formed along the sidewall of the lower case 110. Then, the third horizontal protrusion 197a is pressed by the second supporting plate 118 such that the third elastic plate 197 is slightly bent in the left direction, thereby preventing the horizontal movement of the right guide rail 190.

Referring to FIG. 15, the tray 130 is moved in the direction of the arrow R to be fully inserted into the housing 100. As a result, the second vertical protrusion 196a, which is formed on the bottom of the second elastic plate 196 of the rail cover 192, comes into contact with the third vertical protrusion 136, which is formed on the rail combiner 132 of the tray 130, to press the third vertical protrusion 136 downward. Thus, the vertical movement of the tray 130 is restrained.

Also, the second horizontal protrusion 196b, which is formed on the one side of the second elastic plate 196 of the rail cover 192, comes into contact with the fifth horizontal protrusion 137, which is formed on the right side of the tray 130, to press the fifth horizontal protrusion 137 in the left direction. Further, the fourth horizontal protrusion 198a, which is formed on the outer side of the fourth elastic plate 198 of the rail cover 192, comes into contact with the inner sidewall of the lower case 110, and thus, the fourth elastic plate 198 is slightly bent in the left direction. Due to the bending of the fourth elastic plate 198, its inner side comes into contact with the outer side of the rail combiner 132 of the tray 130 to press the tray 130 in the left direction. Therefore, the vertical movement of the tray 130 is limited because the second horizontal protrusion 196b is in contact with the fifth horizontal protrusion 137, and the outer side of the rail combiner 132 of the tray 130 is in contact with the inner side of the fourth elastic plate 198.

The horizontal restrainers are illustrated and described to be formed on or around the right guide rail 190 to press the tray 130 in the left direction. However, horizontal restrainers may be formed on or around the left guide rail 180 of FIGS. 6A and 6B to press the tray 130 in the right direction.

Figure 16:
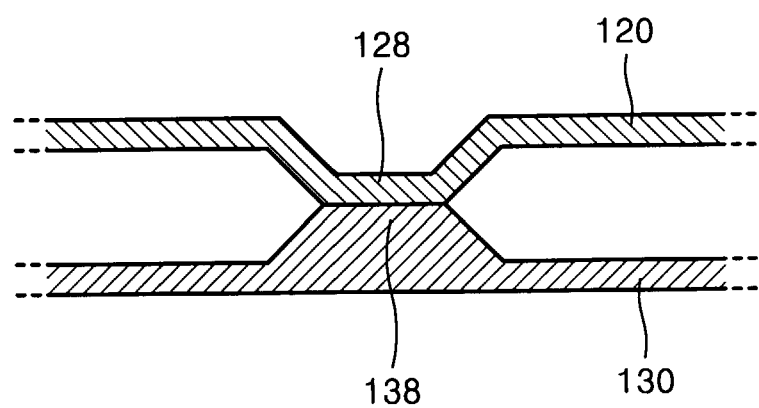
FIG. 16 is a vertical cross-sectional view of supporting protrusions, to explain the vertical restrainers installed on the tray and an upper case.

FIG. 16 is a vertical cross-sectional view of supporting protrusions to explain the vertical restrainers installed on the tray 130 and the upper case 120. Referring to FIG. 16, the vertical restrainers of the tray guide mechanism according to the present invention may include first supporting protrusions 138 that protrude upward from the rear end of the tray 130, and second supporting protrusions 128 that protrude downward from a bottom of the rear end of the upper case 120. The tray 130 may include one first supporting protrusion 138 at its center, and a plurality of first supporting protrusions 138 at a predetermined spacing of the tray. However, if two or more first supporting protrusions 138 are provided on the tray 130, they must be formed adjacent to a respective edge of the tray 130. The second supporting protrusions 128 correspond respectively to the first supporting protrusions 138. When the tray 130 is fully inserted into the housing 100, the second supporting protrusions 128 come into contact with the first supporting protrusions 138, thereby pressing the first supporting protrusions 138 downward. As a result, it is possible to prevent vertical vibration or swaying of the tray 130.

Figure 17:
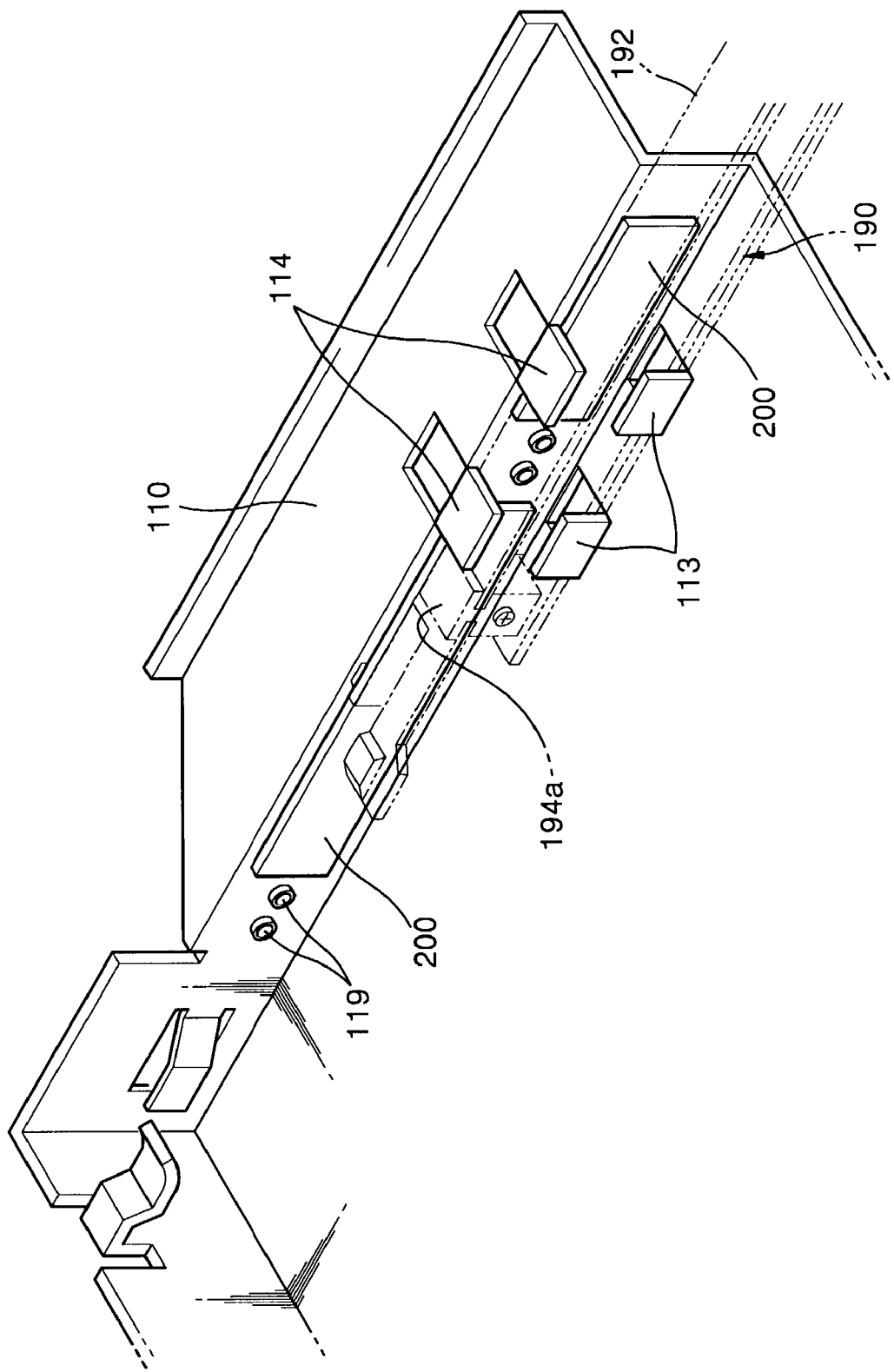
FIG. 17 is a perspective view of a lower case in which a spacer is attached along a right sidewall thereof.

FIG. 17 is a perspective view of the right inner sidewall of the lower case 110 to which a spacer is attached. Referring to FIG. 17, the right guide rail 190 is installed at a right corner of the lower case 110 to slide into or out of the lower case 110. As previously mentioned, the backward and forward movement of the right guide rail 190 is guided by the supporting plates 113 and 114. The forward movement of the right guide rail 90 is limited when the second stopper 194a, which protrudes upward from the rail cover 192, is hooked by the supporting plate 114.

However, screw holes 119 may be formed on the right wall of the lower case 110 to install a hard disc drive in the computer. Here, the screw holes 119 protrude from the right inner wall of the lower case 110 by a predetermined height, thus blocking the sliding movement of the right guide rail 190. For this reason, a spacer 200 is installed on the right inner wall of the lower case 110 to prevent a bumping of the right guide rail 190 against the screw holes 119. The spacer 200 is formed thicker than a height of the screw holes 119, and is formed of a plastic material that is easy to be attached to the right inner wall of the lower case 110 (e.g., Teflon). The right guide rail 190 slides into the lower case 110 being in contact with the spacer 200, and thus, its sliding is not interfered with by the screw holes 119. Also, the spacer 200 may reduce noise caused when the right guide rail 190 slides into the lower case 110.

The screw holes 119 may be formed on the left wall of the lower case 110. Accordingly, the spacer 200 must be installed on the left inner wall of the lower case 110.

The above tray guide mechanism according to the present invention has many advantages. First, the tray guide mechanism is configured such that a guide rail is installed to contact with a rail and a rail cover, and thus, is strengthened to firmly support a tray. Also, a thickness of the rail cover that is molded of a plastic material is reduced, thus lessening a height of the guide rail. Therefore, the tray guide mechanism may be installed in a narrow space of a compact optical disc drive, and further, it is possible to realize a compact optical disc drive due with a slim guide structure.

Secondly, the tray guide mechanism according to the present invention includes vertical and horizontal restrainers that prevent vertical and horizontal vibration or swaying of the tray. Thus, errors do not occur, and noise due to the vibration of the tray is remarkably reduced when reading data with an optical pickup unit. Also, the vertical and horizontal restrainers include elastic plates that are molded of a plastic material and have predetermined elasticity, thus buffering shocks from an outside.

Thirdly, the tray guide mechanism according to the present invention has no additional components other than the guide rail, thereby reducing a weight and manufacturing costs of the optical disc drive.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A tray guide mechanism for an optical disc drive that guides a backward and forward movement of a tray installed to slide into and out of a housing made of a lower case and an upper case, the tray guide mechanism comprising:
   guide rails, to slide into/out of both sides of the upper case, including outer sides to which rail covers, which slide into/out of the lower case while contacting the lower case, are fixed;
   a guide rail supporting unit installed at both sides of the lower case, to prevent the guide rails from deviating from a moving path;
   rail combiners formed at both sides of the tray in the moving path of the tray, and combined with the guide rails to slide into the guide rails;
   a forward moving distance limiting unit to limit a moving distance of the tray and the guide rails in a direction to which the tray and the guide rails project to prevent the tray from detaching from the housing; and
   vertical and horizontal restrainers protruding from the rail covers of the guide rails to prevent a vertical and horizontal movement of the tray inserted into the housing,
   wherein the guide rails are shaped such that the rail combiners are inserted thereinto, and include rails which slide into and out of the rail combiners while remaining in contact with the rail combiners.

2. The tray guide mechanism of claim 1, wherein the rails are formed of a pressed metallic material, and the rail covers are molded of a plastic material to reduce noise when the rail covers slide into the housing.

3. The tray guide mechanism of claim 1, wherein the rails and the rail covers are combined by a plurality of latches and a plurality of latch holes, the latches are formed to protrude from inner sides of the rail covers at predetermined intervals along a length thereof, and the latch holes are formed to the rails and inserted into a plurality of latch holes of the rail covers.

4. The tray guide mechanism of claim 1, wherein the rails and the rail covers are glued together with an adhesive.

5. The tray guide mechanism of claim 1, wherein the horizontal restrainers comprise:
   a first horizontal protrusion that protrudes from an inner side of the first elastic plate formed at the rear end of the rail cover of at least one of the guide rails formed at the both sides of the lower case, and presses an outer surface of the rear end of the tray when the tray is inserted into the housing.

6. The tray guide mechanism of claim 5, wherein the horizontal restrainers further comprise:
   a second horizontal protrusion that protrudes from an inner side of the second elastic plate formed at the front end of the rail cover of at least one of the guide rails installed at the both sides of the lower case, and presses an outer surface of the front end of the tray when the tray is inserted into the housing.

7. The tray guide mechanism of claim 6, wherein the horizontal restrainers further comprise:
   a fifth horizontal protrusion that protrudes outward from the outer surface of the tray and contacts the second horizontal protrusion.

8. The tray guide mechanism of claim 1, wherein the horizontal restrainers comprise:
   a third horizontal protrusion to protrude outward from an outer side of a third elastic plate formed at the rear end of the rail cover of at least one of the guide rails; and
   a second supporting plate to protrude inward from at least one wall of the lower case, to press the third horizontal protrusion inward while contacting the third horizontal protrusion when the tray is inserted into the housing, thereby preventing the horizontal movement of the guide rail.

9. The tray guide mechanism of claim 8, wherein the third elastic plate is extended from a side plate of the rail cover to a predetermined length to be narrower than a width of the side plate of the rail cover, and the second supporting plate is formed by bending a portion of a sidewall of the lower case inward.

10. The tray guide mechanism of claim 8, wherein the horizontal restrainers further comprise:
   a fourth horizontal protrusion that protrudes outward from an outer side of a fourth elastic plate formed at the front end of the rail cover of at least one of the guide rails, and presses an inside portion of the sidewall of the lower case when the tray is inserted into the housing.

11. The tray guide mechanism of claim 10, wherein the fourth elastic plate is extended from a side plate of the rail cover to a predetermined length to be narrower than the width of the side plate of the rail cover.

12. A tray guide mechanism for an optical disc drive that guides a backward and forward movement of a tray installed to slide into and out of a housing made of a lower case and an upper case, the tray guide mechanism comprising:
   guide rails installed to slide into and out of both sides of the upper case;
   a guide rail supporting unit installed at both sides of the lower case, to prevent the guide rails from deviating from a moving path;
   rail combiners formed at both sides of the tray in the moving path of the tray, and combined with the guide rails to slide into the guide rails;

a forward moving distance limiting unit to limit a moving distance of the tray and the guide rails in a direction to which the tray and the guide rails project to prevent the tray from detaching from the housing; and vertical and horizontal restrainers to prevent a vertical and horizontal movement of the tray inserted into the housing, wherein the guide rails are shaped such that the rail combiners are inserted thereinto, and include rails which slide into and out of the rail combiners while remaining in contact with the rail combiners, and rail covers which are fixed to outer sides of the rails and slide into and out of the lower case while being in contact with the lower case, and wherein the guide rail supporting unit comprises a plurality of upper side supporting plates being in contact with the upper sides of the guide rails, and a plurality of side supporting plates being in contact with a side of each of the guide rails.

13. A tray guide mechanism for an optical disc drive that guides a backward and forward movement of a tray installed to slide into and out of a housing made of a lower case and an upper case, the tray guide mechanism comprising:

guide rails installed to slide into and out of both sides of the upper case;

a guide rail supporting unit installed at both sides of the lower case, to prevent the guide rails from deviating from a moving path;

rail combiners formed at both sides of the tray in the moving path of the tray, and combined with the guide rails to slide into the guide rails;

a forward moving distance limiting unit to limit a moving distance of the tray and the guide rails in a direction to which the tray and the guide rails project to prevent the tray from detaching from the housing; and vertical and horizontal restrainers to prevent a vertical and horizontal movement of the tray inserted into the housing, wherein the guide rails are shaped such that the rail combiners are inserted thereinto, and include rails which slide into and out of the rail combiners while remaining in contact with the rail combiners, and rail covers which are fixed to outer sides of the rails and slide into and out of the lower case while being in contact with the lower case, and wherein the forward moving distance limiting unit of the tray comprises:

first stoppers to protrude from front ends of the rails to a predetermined thickness, to limit the distance of the forward movement of the tray by being hooked by stoppers that protrude from inner sides of rear ends of the rail combiners when the tray reaches a position where a disc is ejected; and second stoppers to protrude from upper faces of the rail covers, to limit the forward movement of the guide rails by being hooked by the guide rail supporting unit when the guide rails are moved forward by a predetermined distance.

14. The tray guide mechanism of claim 13, further comprising:

third stoppers installed at the rear ends of the guide rails to block rear ends of the rail combiners when the tray is moved backward, thereby moving the guide rails.

15. The tray guide mechanism of claim 14, wherein the second and third stoppers are molded of a plastic material in one piece and assembled to the rear ends of the guide rails.

16. The tray guide mechanism of claim 15, wherein the second and third stoppers are formed together as a stopper assembly unit inserted into a groove formed at the rear ends of the guide rails.

17. The tray guide mechanism of claim 16, wherein the stopper assembly unit is fixed to the rail covers with a screw or snapping unit.

18. The tray guide mechanism of claim 13, wherein the first stoppers protrude at a predetermined height from a bottom of the rails to limit the forward movement of the tray.

19. The tray guide mechanism of claim 18, further comprising:

a stopping sill to protrude from an end portion of inner sides of the rail combiners of the tray and combine with the first stoppers, thereby preventing the forward movement of the tray.

20. A tray guide mechanism for an optical disc drive that guides a backward and forward movement of a tray installed to slide into and out of a housing made of a lower case and an upper case, the tray guide mechanism comprising:

guide rails installed to slide into and out of both sides of the upper case;

a guide rail supporting unit installed at both sides of the lower case, to prevent the guide rails from deviating from a moving path;

rail combiners formed at both sides of the tray in the moving path of the tray, and combined with the guide rails to slide into the guide rails;

a forward moving distance limiting unit to limit a moving distance of the tray and the guide rails in a direction to which the tray and the guide rails project to prevent the tray from detaching from the housing; and vertical and horizontal restrainers to prevent a vertical and horizontal movement of the tray inserted into the housing, wherein the guide rails are shaped such that the rail combiners are inserted thereinto, and include rails which slide into and out of the rail combiners while remaining in contact with the rail combiners, and rail covers which are fixed to outer sides of the rails and slide into and out of the lower case while being in contact with the lower case, and wherein the vertical restrainers comprise:

first vertical protrusions to protrude upward from upper sides of first elastic plates formed on the rear ends of the rail covers; and first supporting plates to protrude forward from rear walls of the lower case, to press the first vertical protrusions downward while contacting the first vertical protrusions when the tray is inserted into the housing, thereby preventing the guides rails from moving vertically with respect to the first supporting plates.

21. The tray guide mechanism of claim 20, wherein the first elastic plates are extended from upper plates of the rail covers to a predetermined length to be narrower than a width of the upper plates of the rail covers, and the first supporting plates are formed by bending a portion of the rear wall of the lower case forward.

22. The tray guide mechanism of claim 20, wherein the vertical restrainers protrude downward from a bottom of second elastic plates, which are formed at front ends of the rail covers, and further comprises:

second vertical protrusions that press upper sides of front ends of the rail combiners when the tray is inserted into the housing.

23. The tray guide mechanism of claim 22, wherein the vertical restrainers further comprise:

third vertical protrusions that protrude upward from the upper sides of the front ends of the rail combiners to contact the second vertical protrusions, thereby preventing the tray from moving vertically with respect to the guide rails.

24. The tray guide mechanism of claim 23, wherein the second elastic plates are extended forward from the upper plates of the rail covers to a predetermined length to be narrower than the width of the upper plates of the rail covers.

25. The tray guide mechanism of claim 22, wherein the first and second elastic plates are made by plastic injection and function as buffer agents against outer shocks, thereby preventing vibration and swaying of the tray.

26. The tray guide mechanism of claim 20, wherein the vertical restrainers further include first supporting protrusions that protrude upward from an upper surface of the rear end of the tray, and second supporting protrusions that protrude downward from a bottom of rear ends of the upper case and come into contact with the first supporting protrusions when the tray is inserted into the housing to prevent vertical vibration and swaying of the tray.

27. The tray guide mechanism of claim 26, further comprising:
at least two first supporting protrusions are respectively positioned adjacent to both edges of the tray, and at least two second supporting protrusions are installed to correspond to the first supporting protrusions.

28. A tray guide mechanism for an optical disc drive that guides a backward and forward movement of a tray installed to slide into and out of a housing made of a lower case and an upper case, the tray guide mechanism comprising:
guide rails installed to slide into and out of both sides of the upper case;
a guide rail supporting unit installed at both sides of the lower case, to prevent the guide rails from deviating from a moving path;
rail combiners formed at both sides of the tray in the moving path of the tray, and combined with the guide rails to slide into the guide rails;
a forward moving distance limiting unit to limit a moving distance of the tray and the guide rails in a direction to which the tray and the guide rails project to prevent the tray from detaching from the housing; and
vertical and horizontal restrainers to prevent a vertical and horizontal movement of the tray inserted into the housing, wherein the guide rails are shaped such that the rail combiners are inserted thereinto, and include rails which slide into and out of the rail combiners while remaining in contact with the rail combiners, and rail covers which are fixed to outer sides of the rails and slide into and out of the lower case while being in contact with the lower case, and wherein the tray guide mechanism further comprises;
a spacer installed at a sidewall of the lower case to a predetermined thickness, to prevent a bumping of the guide rail against screw holes by which a hard disc drive is installed into a computer.

29. The tray guide mechanism of claim 28, wherein the spacer is formed of a plastic material that is thicker than protrusions of the screw holes.

30. A tray guide mechanism for an optical disc drive that guides a backward and forward movement of a tray installed to slide into and out of a housing made of a lower case and an upper case, the tray guide mechanism comprising:
guide rails, installed to slide into/out of both sides of the upper case, including outer sides to which rail covers, which slide into/out of the lower case while contacting the lower case, are fixed;
a guide rail supporting unit installed at both sides of the lower case, to prevent the guide rails from deviating from a moving path;
rail combiners formed at both sides of the tray in the moving path of the tray, and combined with the guide rails to slide into the guide rails;
a forward moving distance limiting unit to limit a moving distance of the tray and the guide rails in a direction to which the tray and the guide rails project to prevent the tray from detaching from the housing;
vertical restrainers to protrude from the rail covers of the guide rails to prevent a vertical movement of the tray inserted into the housing; and
horizontal restrainers to protrude from the rail covers of at least one of the guide rails to prevent a horizontal movement of the tray inserted into the housing,
wherein the guide rails are shaped such that the rail combiners are inserted thereinto, and include rails which slide into and out of the rail combiners while remaining in contact with the rail combiners.

* * * * *